Oct. 10, 1967  R. W. MILITZER  3,345,783
CENTERLESS HONING APPARATUS
Filed Feb. 14, 1964  4 Sheets-Sheet 1
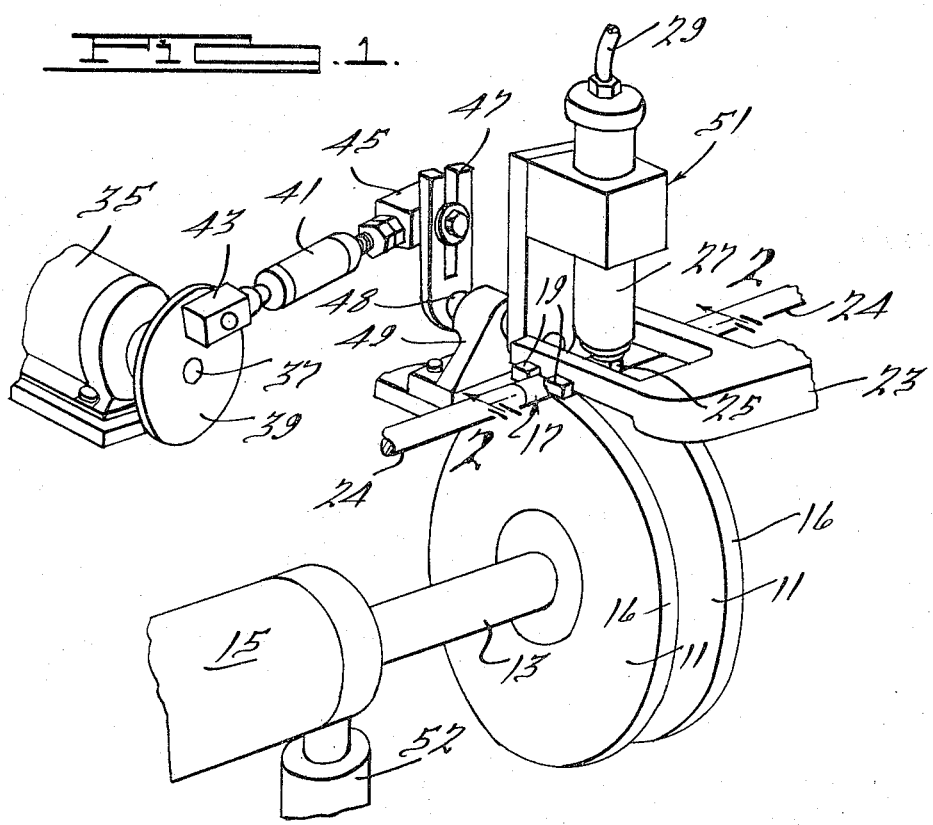
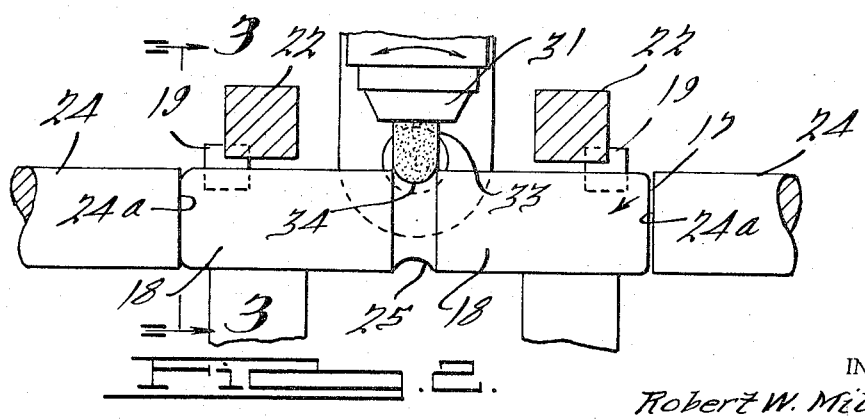
INVENTOR.
Robert W. Militzer
BY
Harness, Dickey & Pierce
ATTORNEYS.

Oct. 10, 1967  R. W. MILITZER  3,345,783
CENTERLESS HONING APPARATUS
Filed Feb. 14, 1964  4 Sheets-Sheet 2

INVENTOR.
Robert W. Militzer
BY
Harness, Dickey & Pierce
ATTORNEYS

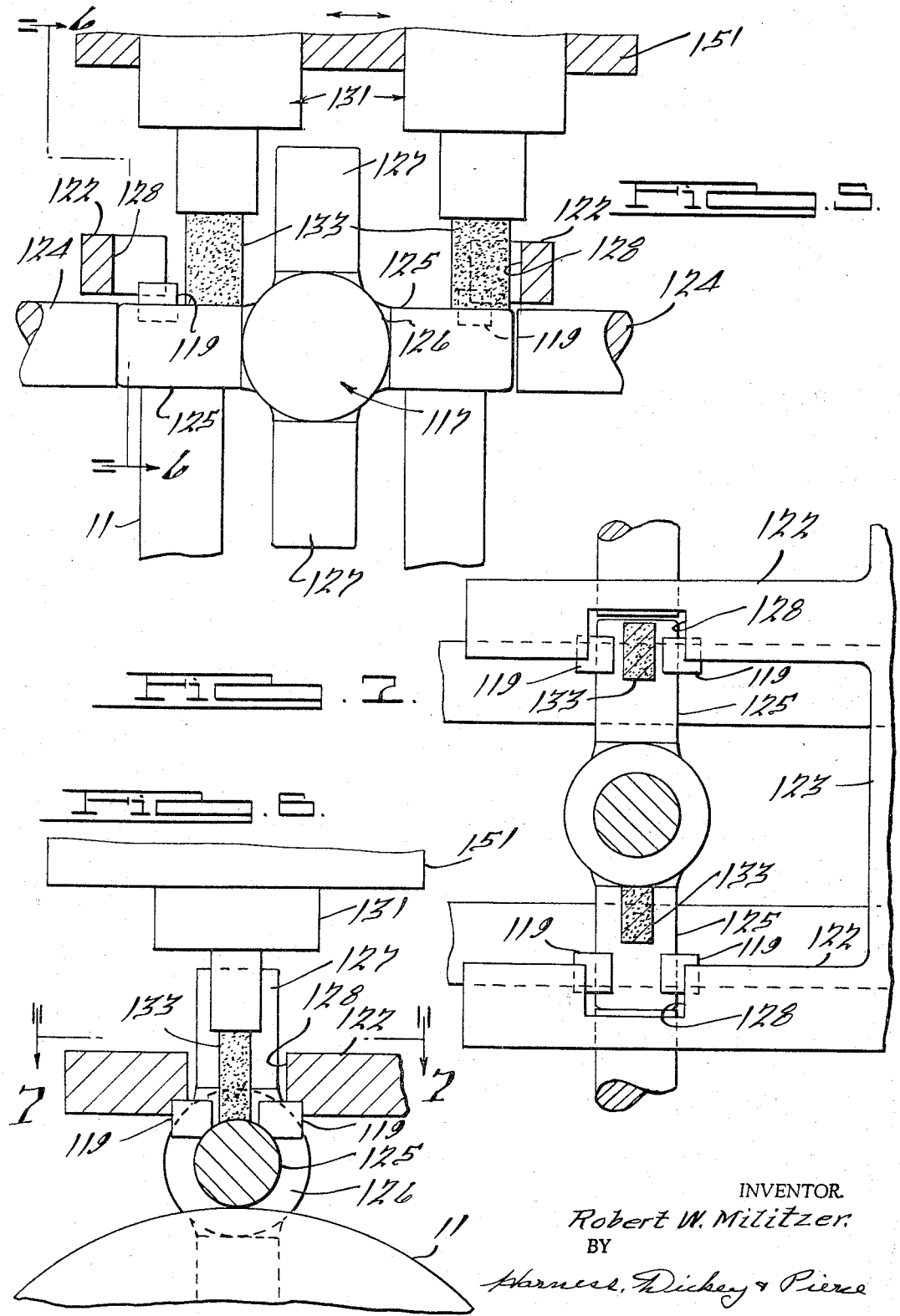

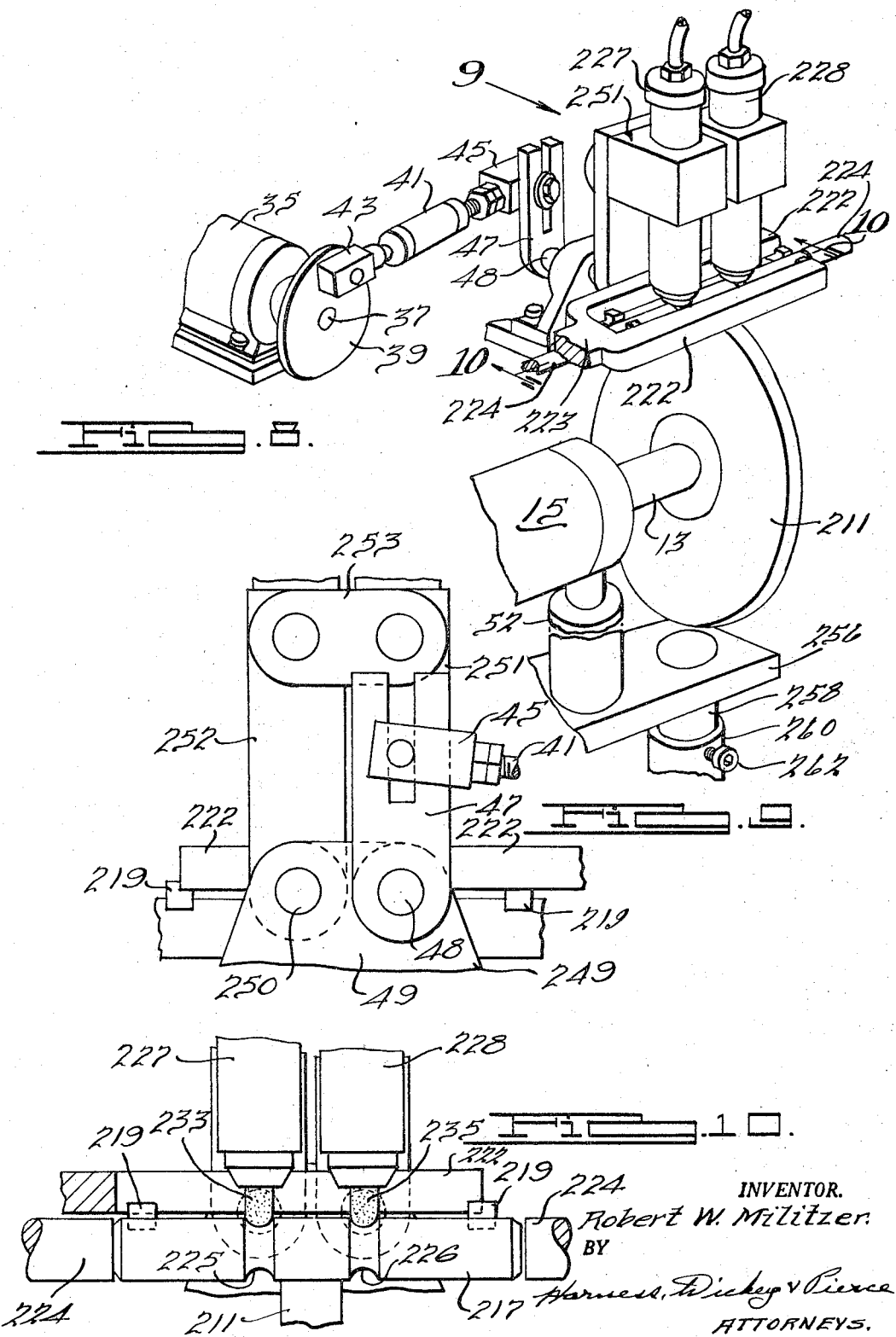

United States Patent Office 3,345,783
Patented Oct. 10, 1967

3,345,783
CENTERLESS HONING APPARATUS
Robert W. Militzer, Huntington Woods, Mich., assignor to Micromatic Hone Corporation, Detroit, Mich., a corporation of Michigan
Filed Feb. 14, 1964, Ser. No. 345,005
6 Claims. (Cl. 51—58)

This invention relates generally to honing and, particularly, to a method and apparatus for centerless honing of workpieces having external surfaces of round cross-sectional shape.

In the art of finishing bearing surfaces on parts subject to high rotational speeds during use, it is of the utmost importance that such surfaces possess an extremely accurate geometrical shape and fine surface finish. A bearing surface of supposedly circular cross section which is, in fact, out-of-round or is formed withe lobes and valleys will be subjected to extreme stress and rapid wear, even if the bearing surface irregularities are of a relatively small dimension when measured by traditional standards of accuracy. For example, in finishing the peripheral surface of various high speed shafts and bearing races and the like, any machining inaccuracies on the finished surface will create vibrational stresses in both the shaft and bearing as well as their associated structure. This frequently results in accelerated wear of these parts and premature failure. Various types of machining devices and processes have been proposed and used in the past in an attempt to achieve high precision external round surfaces on this type of workpiece and have met with various degrees of success. However, where a high speed, high precision rotational surface finish is required, the finishes achieved by heretofore known devices were not always entirely satisfactory.

The present invention deals with an improved method and apparatus effective to finish surfaces of revolution accurate to within 0.000015 (15 millionths) of an inch which, in high speed, high precision use, is highly satisfactory. By this invention, a workpiece is rotated by frictional contact between the periphery of a rotating drive wheel and the surface to be finished or other external peripheral surface of the part coaxial with the surface to be finished. Locating means, which may be in the form of highly polished backup shoes of tungsten carbide or other suitable substance, are positioned to engage a workpiece peripheral surface at circumferentially and/or axially spaced locations on the side of its rotational axis opposite the drive wheel and maintain the workpiece in nonslipping drive contact therewith. The backup shoes may be formed generally concave and complementary to the workpiece surface which they engage and they serve to establish an axis of rotation coincident with the axis of said workpiece surface. A honing tool is movable into engagement with the workpiece surface to be finished at a point generally diametrically opposite the drive wheel and between the backup shoes to apply a pressurized abrading action thereto while undergoing movement axially of the workpiece.

It is, therefore, an object of the present invention to provide an improved honing device capable of abrading a surface of circular cross section in a highly accurate and controlled manner.

It is a further object of the present invention to provide a honing device for surfaces of circular cross-sectional shape wherein the workpiece is rotatably driven during the honing operation.

It is a further object of the present invention to provide a honing device and method of the above character capable of use with workpieces of a variety of sizes and configurations.

It is a further object of the present invention to provide a centerless honing device of the above character which is rugged in construction and reliable in operation.

Other objects and advantages of the present invention will become more apparent from the following detailed description taken in conjunction with the drawings in which:

FIGURE 1 is a fragmentary perspective view showing a device embodying the principles of the present invention;

FIG. 2 is an enlarged sectional view of the structure of FIG. 1, taken along the line 2—2 thereof;

FIG. 5 is an enlarged sectional view of the structure of FIG. 4 taken along the line 5—5 thereof;

FIG. 6 is a sectional view of the structure of FIG. 5 taken along the line 6—6 thereof;

FIG. 7 is a sectional view of the structure of FIG. 6 taken along the line 7—7 thereof;

FIG. 8 is a view similar to FIG. 1, showing another modification thereof;

FIG. 9 is an enlarged view of the structure of FIG. 8 looking in the direction of the arrow 9; and FIG. 10 is an enlarged sectional view of the structure of FIG. 8 taken along the line 10—10 thereof.

Figure 3:
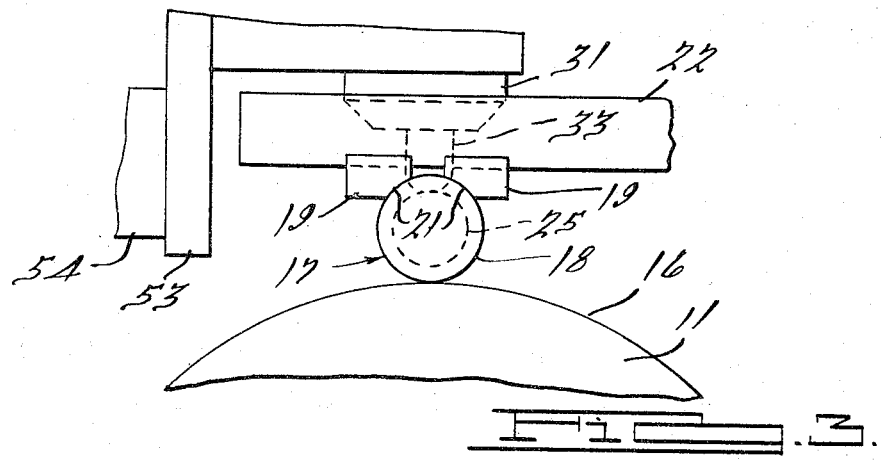
FIG. 3 is a sectional view of the structure of FIG. 2 taken along the line 3—3 thereof.

Referring now to FIGURES 1–3 of the drawings, the centerless honing device shown therein is seen to include a pair of spaced-apart disc-type drive wheels 11 adjustably keyed to an output shaft 13 of a suitable rotary power source 15. A circular cylindrical periphery 16 of each of the drive wheels 11 is adapted to frictionally engage an outer peripheral surface 18 of a workpiece 17. It will be seen that the peripheral surface 18 is of circular cross section. The drive wheel peripheries 16 may be provided with suitable frictional material and the drive wheel assembly, including the wheels 11 and the rotary power source 15, may be designed for unitary vertical movement. Thus, when a workpiece 17 is positioned as illustrated in FIGS. 1–3, said drive wheel assembly may be moved vertically until the wheels 11 engage the peripheral surface 18 of the workpiece 17. Thereafter, energization of power source 15 will cause rotation of the workpiece.

Positioned to engage the workpiece peripheral surface 18 at circumferentially spaced points on the side of the workpiece axis of rotation opposite the drive wheels 11 are two pairs of backup and locating shoes 19 constructed of highly polished tungsten carbide or other suitable non-abrasive material. As shown, the two pairs of shoes 19 are spaced along the workpiece axis from one another and each shoe is formed with an arcuate surface 21 which substantially conforms to the peripheral surface 18 of the workpiece 17. Each pair of shoes 17 is suitably secured to a separate one of a pair of arms 22 of a bracket 23 which, in turn, is mounted on a suitable fixed support, such as a machine frame (not shown). Also, end guides 24, which may be made from tungsten carbide and are carried by the machine frame (not shown), are provided with flat radial walls 24a positioned to engage the workpiece 17 at either end thereof to accurately position and retain it in the honing station in which the workpiece is illustrated.

The workpiece 17 illustrated in FIGS. 1–3 consists of a high speed shaft for a pump having an annular groove 25 of arcuate cross section which forms the inner race or ball track of a ball bearing. During honing, the pairs of backup shoes 19 will engage the workpiece at axially spaced locations, one pair on either side of the groove 25 to permit free access thereto by a honing tool assembly. This tool assembly may be constructed in a manner similar to that shown in U.S. Patent No. 3,067,547, and includes a fluid motor 27 having a piston (not shown) which is supplied with air or hydraulic fluid through a conduit 29 to move the piston vertically downwardly. Said piston is operatively connected to an elongated honing stone 33 to advance said stone through a guide 31 at the lower end of the tool. The honing stone 33 is shown as having an arcuate working face 34 shaped complementary to groove 25. Thus, when fluid under pressure is supplied to the fluid motor through conduit 29, the stone 33 will be moved downwardly to contact the workpiece 17 in the groove 25 thereof with a working pressure determined by the pressure of the fluid delivered through the conduit 29.

Means are provided to oscillate the honing stone 33 during the time that it is positioned within groove 25. Such means includes a suitable source of rotary power, such as an electric motor 35, having an output shaft 37 keyed to a drive wheel 39. A connecting rod 41 carries an adapter 43 at its one end which has an eccentric rotary connection to the wheel 39 while the other end of the rod 41 carries an adapter 45 having an adjustable rotary connection to a slotted bar 47. The bar 47, in turn, is fastened to a shaft 48 supported by a fixed bearing member 49, for oscillating movement about a fixed axis. A tool holder or bracket 51, also fastened to the shaft 48, supports the fluid motor 27 so that the stone 33 carried by the fluid motor will engage in the groove 25. From the foregoing, it will be apparent that rotation of the drive shaft 37 will produce oscillation of the bracket 51, and thus the stone 33, about the axis of the shaft 48. This axis is arranged tangentially with respect to the circle defining the center or axis of the groove 25, and perpendicular to the axis of rotation of the workpiece 17.

In addition to their function of rotating the workpiece 17, the drive wheels 11 also serve to maintain the workpiece against one of the end stops 24.

Although not shown in the drawings because of the small degree thereof, the drive wheels 11 have their axis of rotation canted or inclined with respect to the axis of the workpiece. The degree of this inclination may range from ½ of one degree to 3 or even 5 degrees, and the inclination is in a horizontal plane. Depending upon the direction of inclination with respect to the direction of rotation of the drive wheel, the workpiece 17 will be forced against one of the end stops. Preferably, the drive wheel assembly 11–13–15 is adjustable about a vertical axis to incline the drive wheel axis in either direction from a position parallel to the axis of the workpiece. Thus, the groove 25 may be located with respect to either end of the workpiece 17. In practice, an inclination of about 1½° has been found to be satisfactory.

In operation, the workpiece 17 is positioned at the work station, after which the wheels 11 are raised into contact with the workpiece periphery 18 and are rotated to impart corresponding rotation to the workpiece and bias the workpiece against one of the end stops 24. Fluid is then supplied to the motor 27 through the conduit 29 to lower the stone 33 into contact with the workpiece groove 25, after which the motor 35 is activated. This will cause the plate 39 to be rotated about its central axis and, therefore, the stone will oscillate about the center of its working surface and the center of groove 25. Upon the completion of the honing operation, the motor 35 is deactivated, the stone 33 is retracted and the wheels 11 are lowered. The finished workpiece may then be removed and the next workpiece inserted.

It should be mentioned that the drive wheel assembly 11–13–15 is preferably raised and lowered by a fluid power cylinder representatively shown at 52 which is pressurized throughout the honing operation to maintain contact pressure between the wheels 11 and the workpiece 17. The force that is applied by this cylinder is substantially greater than the force applied to the stone 33 by the fluid motor 27 and, therefore, there is no danger in the stone 33 applying a force sufficient to move the workpiece 17 away from the shoes 19.

In practice, it has been found practical to use drive wheels 11 made from a resinoid bonded abrasive of a fine grit. However, a variety of materials having good frictional characteristics can be used with practically no slippage characteristics between the wheels 11 and the workpiece 17.

While no specific workpiece feeding means or control means for fluid flow to motor 27 has been illustrated or described herein, it is to be understood that suitable control and feed means capable of functioning in the desired manner are within the capabilities of the skilled mechanic. It will also be apparent that the arc through which the stone 33 is oscillated can be adjusted by moving the adapter 45 up or down in the slotted bar 47.

A modification of the present invention which is adapted to hone another type of workpiece having external surfaces of circular cross section is illustrated in FIGS. 4–7. This honing device is seen to include the use of the same spaced drive wheels 11 keyed to the shaft 13 driven by the power source 15. As in the device of FIGS. 1–3, the entire drive wheel assembly is vertically movable, and the axis of the wheels 11 is canted slightly with respect to the axis of the work. One type of workpiece which can be honed by this device is shown at 117 as comprising the yoke or cross pin of a universal joint. The workpiece will be seen to have a first pair of spaced axially aligned arms 125 extending from opposite sides of a central web portion 126. A second pair of axially aligned arms 127 project from opposite sides of the web portion 126 in right angle relation to the arms 125. Two pairs of backup shoes 119, spaced apart axially of the arms 125, engage the circular cylindrical peripheries of the arms 125. The shoes 119 of each pair are spaced apart circumferentially of the work on the side of the workpiece rotational axis opposite from the drive wheels 11. Each pair of shoes 119 is carried by one of a pair of spaced arms 122 of a bracket 123. The arms 122 and the bracket 123 are similar to the arms 22 and the bracket 23 of the device of FIGS. 1–3, except that each of the arms 122 is recessed at 128 to permit the honing stones to travel the full length of the arms 125. Suitable end stops 124 are provided for selective use in positioning the workpiece at the honing station. The spacing between the arms 122 provides room for the rotation of the workpiece arms 127.

The honing tool assembly of FIGS. 4–7 is seen to include a honing head 131 which supports a pair of air cylinders 131 of identical construction to the air cylinders 27. A pair of honing stones 133 are carried by one of the cylinders 131 for movement therein and each stone 133 is concavely shaped at its working surface to conform to the peripheries of the arms 125. To motivate downward vertical movement of the stones 133, a pressurized fluid, such as air, is supplied to the cylinders 131 through conduits 127 to move the pistons (not shown) slidable therein. The piston of each cylinder 131 is suitably connected to a respective one of the stones 133. The stones 133 may be retracted by fluid pressure.

Figure 4:
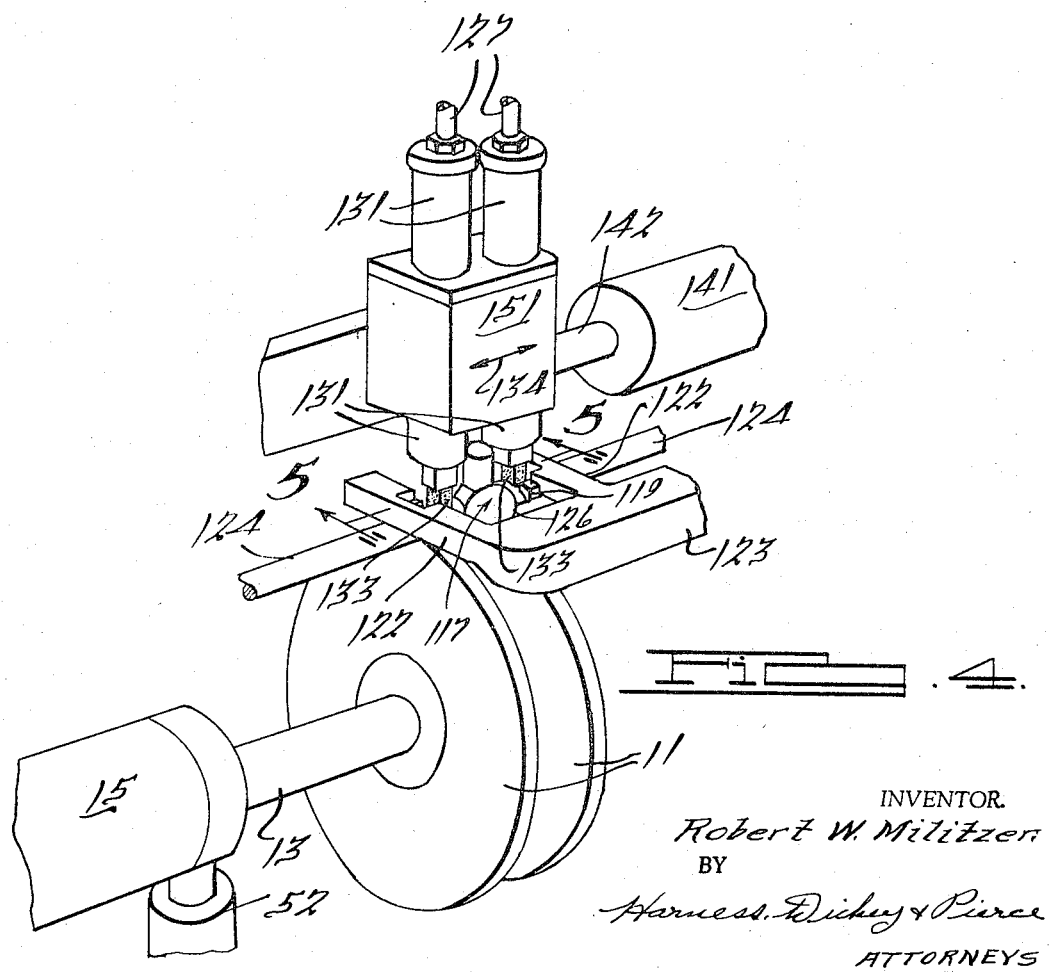
FIG. 4 is a view similar to FIG. 1 showing a modification thereof.

Means are provided to reciprocate the honing head 151 in a direction parallel to the workpiece arms 125 as shown by the arrow 134 in FIG. 4. Such means are representatively illustrated by the power cylinder 141 and connecting rod 142 in FIG. 4.

In the operation of the apparatus of FIGS. 4–7, a workpiece is positioned at the honing station and the drive wheel assembly 11–13–15 is moved vertically to position the periphery of the wheels 11 in contact with the peripheral surfaces of the arms 125, which are to be honed, and the wheels 11 are driven in rotation. Fluid is supplied under pressure to the fluid motors 131 to move the honing stones 133 downwardly until the stones 133 contact the workpiece. Thereafter, the connecting rod 141 is reciprocated to reciprocate the honing head 151 and the stones 133 axially of the workpiece. The shoes 119 establish an axis of rotation for the work coincident with the axis of the arms 126. Further, one of the end stops 124 will establish the axial position of the workpiece 117.

The honing stones are reciprocated throughout the entire axial length of the arms 125 and therefore the entire bearing surface of these arms are honed. As the work is driven in rotation, the peripheral surfaces of the arms 125, which are being honed, will slide over the shoes 119. As the roundness of said surfaces is improved by the stones 133, centering of the part will be improved and this will, in turn, be reflected in increased accuracy in the finishing of the surfaces being honed.

Still another embodiment of the invention is illustrated in FIGS. 8–10. This embodiment of the invention will be seen to use a single drive wheel 211 mounted on the shaft 13 of the drive motor 15. As in the prior embodiments, the axis of the wheel 211 is adapted to be canted with respect to the axis of the workpiece. As in the prior embodiments, the drive wheel 211 and its motor 15 are arranged for vertical movement by a fluid power cylinder 52. As best seen in FIG. 10, a workpiece 217 having an outer peripheral surface of circular cylindrical shape is frictionally contacted by the drive wheel 211 so as to be driven in rotation about its longitudinal axis. The workpiece 217 is engageable with one of a pair of end stops 224 to establish the axial position thereof. A fixed bracket 223 having two spaced arms 222 extending parallel to the axis of the work serve to support four tungsten carbide shoes 219. Each of the shoes 219 has an arcuate surface conforming to the periphery of the workpiece 217 which the workpiece 217 slidably contacts. The shoes 219 are arranged in pairs, one pair of shoes 219 being affixed to one of the arms 222 and the other pair of shoes 219 being affixed to the other one of the arms 222. The shoes 219 are, therefore, spaced apart from one another both axially and circumferentially. The particular workpiece 217 is provided with two peripheral grooves 225 and 226 which are spaced axially from one another and which are of arcuate or segmentally circular cross section. It is in the area between the two grooves 225 and 226 that the workpiece 217 is contacted by the drive wheel 211, while the shoes 219 are located outwardly of the grooves 225 and 226. The groove 225 is engaged by an abrasive stone 233; whereas, the groove 226 is engaged by an abrasive stone 235. The stone 233 is carried by a fluid motor or air cylinder 227; whereas, the abrasive stone 235 is carried by a fluid motor or air cylinder 228. It will be seen that both abrasives 233 and 235 have arcuately shaped working faces arranged to conformably seat in the grooves 225 and 226, respectively. In addition, each of the stones 233 and 235 is arranged to oscillate about its own axis, said axes being parallel to one another and being perpendicular to the axis of the workpiece 217. The axis of oscillation of each stone coincides with the center about which the working face of the stone is generated and each of said axis is tangential to the circular axis about which its adjacent grooves 225 or 226 is generated.

The structure by which the fluid motors 227 and 228 are supported includes may of the parts illustrated in the embodiment in FIGS. 1–3. Such similar parts include the rotary drive motor 35, the drive shaft 37, the wheel 39 driven by the drive shaft 37, the connecting rod 41, the connecting rod adapters 43 and 45, the slotted bar 47 and the shaft 48. In addition to said parts, the structure of FIGS. 8–10 includes a bearing member 249 supporting the shaft 48 for oscillation about a fixed axis. It will be apparent that operation at the motor 35 is effective to produce oscillation of the shaft 48 about a predetermined axis and through a given arc. This oscillatory movement is also imparted to a tool holder or bracket 251 fastened to the opposite end of the shaft 48 from the slotted bar 47. The bracket 251 serves to support the air cylinder 227 with its abrasive stone 233 arranged for vertical movement into and out of engagement with the workpiece groove 225. The bearing 49 also supports a shaft 250 in parallel relation to the shaft 48. A tool holder or bracket 252 is fixed to the shaft 250 and extends upwardly in a position adjacent to the tool holder 251. A link 253 is pivotally connected at its opposite ends to the tool holders 251 and 252. By this means, oscillatory movement of the tool holder 251 is transmitted to the tool holder 252 so that both of said tool holders will oscillate in unison about "side-by-side" axes.

The structure of FIGS. 8–10 enables the simultaneous honing of two spaced grooves on a given workpiece. The arrangement is such as to assure that the grooves will be accurately positioned wtih respect to a given axis of rotation. While the embodiment of FIGS. 1–3 showed the use of one honing stone and two drive wheels, the embodiment of FIG. 8–9 utilizes two honing stones and one drive wheel. In both cases, however, the arrangement of parts is such as to keep the workpiece firmly located against the shoes and in sliding contact therewith throughout the honing operation.

FIG. 8 will be seen to illustrate a pivotal support for drive wheel assembly 11–13–211. This assembly is shown to rest on a platform 256 which is pivotally adjustable about the vertical axis of a post 258. The post 258 has bearing support in a portion 260 of the machine frame. Means are shown at 262 for locking the platform in a desired angular position. The axis of the post 258 passes through the midplane of the drive wheel 211 and the axis of rotation of the workpiece. Therefore, when an adjustment in the axis of the wheel 211 is made, it will still contact the workpiece 217 in the same place. In this connection it is noted that the drive wheel or wheels, in all embodiments of the invention, preferably contact the workpiece at a location which falls on a plane passing midway between the circumferentially spaced shoes. Accordingly, the drive wheel will bias the workpiece against the locating shoes with substantially equal forces.

In each of the workpieces illustrated herein, it will be seen that the work is locatde by two pairs of shoes having surfaces contacting the work over an arcuate area. The work is positively held against these shoes and is driven in rotation by an oppositely located drive wheel. Further, the work is contacted over an extensive arcuate area by a honing tool located between at least one pair of shoes. This approach to the finishing of parts having external surfaces of revolution has been found to yield results which are accurate beyond anything heretofore known in the abrasive finishing of such parts.

Where in the specification and claims reference is made to the fact that the honing stone is movable laterally with respect to the direction of rotational movement of the workpiece, this recitation is intended to indicate movement of a honing tool either linearly along the surface of the workpiece (FIGURE 4) or in a pivotal fashion (FIGURES 1 and 8). In a like manner, reference to transverse movement of the honing tool is intended to cover movement of the honing tool toward and away from the workpiece.

While three commercially practical embodiments of the invention have been described and illustrated herein somewhat in detail, it will be understood that various changes may be made as may come within the purview of the accompanying claims.

What is claimed:

1. A device for honing a surface of revolution of a round cross-sectional workpiece comprising a drive wheel rotatable about a central axis and engageable with a peripheral surface of the workpiece for rotating the workpiece about its longitudinal axis, first and second pairs of fixed locating shoes, said pairs of locating shoes being spaced from each other along the central axis of said drive wheel, each shoe of each pair of shoes having a segmented cylindrical surface adapted to engage the adjacent peripheral surface of the workpiece, said segmented cylindrical surfaces of the respective shoes of each pair being disposed substantially equidistant from a plane including the area of engagement of said drive wheel with the workpiece and the axis of rotation of said drive wheel, and a honing stone engageable with tthe workpiece at the surface of revolution, said honing stone being supported on the same side of the workpiece as said shoes.

2. A device as set forth in claim 1 further including means for moving the honing stone laterally with respect to the direction of rotational movement of the peripheral surface of the workpiece.

3. A device as set forth in claim 1 further including means for oscillating the honing stone about an axis perpendicular to the axis of rotation of the workpiece for forming a groove in the workpiece.

4. A device as set forth in claim 1 wherein the drive wheel has its axis of rotation inclined at a small degree with respect to the axis of rotation of the workpiece to bias the workpiece in an axial direction and further including an end stop engageable with an end of the workpiece to limit movement thereof in said axial direction.

5. A device as set forth in claim 1 further including a second honing stone spaced laterally from the first mentioned honing stone and further including means for simultaneously moving said honing stones transversely of the direction of rotational movement of the workpiece.

6. A device as set forth in claim 3 further including a second honing stone supported for oscillation about an axis parallel to the axis of oscillation of the first mentioned honing stone, and means for simultaneously oscillating said honing stones about their respective oscillatory axes.

References Cited
UNITED STATES PATENTS

| | | | |
|---|---|---|---|
| 1,733,086 | 10/1929 | Sobolewski | 51—103.1 |
| 2,086,492 | 7/1937 | Ekholm et al. | 51—103.1 X |
| 2,626,486 | 1/1953 | Olson | 51—59 |
| 2,939,253 | 6/1960 | Richard et al. | 51—103 |
| 3,067,547 | 12/1962 | Paden et al. | 51—58 |
| 3,075,321 | 1/1963 | Seidel | 51—103 |
| 3,115,729 | 12/1963 | Render | 51—103 |
| 3,139,707 | 7/1964 | Andrews | 51—48 |

ROBERT C. RIORDON, *Primary Examiner.*

J. A. MATHEWS, *Assistant Examiner.*